United States Patent [19]
Osterberg et al.

[11] Patent Number: 5,816,373
[45] Date of Patent: Oct. 6, 1998

[54] PNEUMATIC TUNED MASS DAMPER

[75] Inventors: David A Osterberg, Glendale; Toren S. Davis, Peoria, both of Ariz.

[73] Assignee: Honeywell Inc., Minneapolis, Minn.

[21] Appl. No.: 822,970

[22] Filed: Mar. 21, 1997

[51] Int. Cl.$^6$ .............................. F16F 7/00; B60G 13/16
[52] U.S. Cl. ........................................... 188/380; 188/378
[58] Field of Search ..................... 188/378, 379, 188/380

[56] References Cited

U.S. PATENT DOCUMENTS

| | | | |
|---|---|---|---|
| 1,737,048 | 11/1929 | Hunt | 188/380 |
| 5,263,560 | 11/1993 | Bayer | 188/380 |
| 5,487,375 | 1/1996 | McDonald, Jr. | 188/380 |

FOREIGN PATENT DOCUMENTS

| | | | |
|---|---|---|---|
| 404272539 | 9/1992 | Japan | 188/380 |
| 1184989 | 10/1985 | U.S.S.R. | 188/380 |

*Primary Examiner*—Matthew C. Graham
*Attorney, Agent, or Firm*—Charles J. Ungemach

[57] ABSTRACT

A tuned mass damper incorporating a container with an inside surface, two end portions and a mass mounted for oscillation between the end portions by a pair of bias springs, the two end portions being filled with a compressible gas to reduce the effects of temperature variations on the damping characteristics, to increase the damping with increased amplitude of oscillation of the mass and to minimize size and weight of the damper, the mass being supported for oscillation by using a plurality of grooves at each end of the mass with a single ball in each groove to provide frictionless and self centering motion of the mass.

11 Claims, 2 Drawing Sheets

PNEUMATIC TUNED MASS DAMPER

BACKGROUND OF INVENTION

1. Field of the Invention

The present invention relates to tuned mass damping devices and more particularly to a pneumatic tuned mass damper utilizing a compressible fluid such as gas so as to obtain better damping under varying temperature conditions, to provide lower damping at low amplitude vibration and higher damping at high amplitude vibrations and to do so with a smaller, lighter structure.

2. Description of the Prior Art

In the prior art, tuned mass dampers are known. Such dampers usually contain a mass mounted for movement in a container of non-compressible fluid and positioned by a spring. A passage through or around the mass allows the non-compressible fluid to move from one side of the mass to the other as the mass moves in the container. An expandable chamber such as a bellows is also connected to the container to allow for expansion of the non-compressible fluid with temperature changes. By proper selection of the mass and the spring, the mass may be made so that it will oscillate at a desired frequency, for example, the same as the natural frequency of a structure such as a boom to which the damper is attached. By proper selection of the viscosity of the fluid and the size of the restriction provided by the aperture, the proper damping may be obtained so that when the boom experiences shock and begins to sway in a direction, the mass begins to vibrate or oscillate in the same direction and at the same frequency. However, since the boom is an input to the damper, the damper vibrates 180 degrees out of phase with the boom, which motion tends to cancel the boom motion. Since the boom is now vibrating at an off-resonant frequency and the damper has absorbed a substantial portion of its energy, the boom displacement is much smaller and is effectively damped out by the fluid in the damper.

Tuned mass dampers are very sensitive to changes in damping which varies with viscosity changes, and since even the most stable of non-compressible fluids still has rather large changes in viscosity with temperature changes, the performance of the tuned mass damper of the prior art is reduced when operated over a varying temperature range. Although heaters can be used to stabilize temperatures, they add size and weight to the system and, in space applications it is very difficult to add heaters at the end of a boom. With no heater available for maintaining the temperature of the tuned mass damper the damping is not stable. Another disadvantage of the prior art dampers is the additional size and weight which accompanies the requirement to have the expandable chamber or bellows for receiving and transmitting the incompressible fluid with temperature changes.

BRIEF DESCRIPTION OF THE PRESENT INVENTION

The present invention overcomes the problems in the prior art by providing a damper which utilizes a compressible or pneumatic fluid such as a gas in place of the non-compressible fluid of the prior art. Since the gas is compressible, the requirement for the additional expandable chamber is obviated. The size of the mass and the stiffness of the spring are chosen to provide the desired damping frequency. The pressure of the gas is selected so that the gas density in combination with the restriction geometry of the passage through the mass provides the desired damping. Although the kinematic viscosity of a gas varies with its density and temperature, once the gas is sealed in the container, its volume cannot change and so its density remains constant. Only the pressure and viscosity of the gas can now change with temperature and variations in pressure do not significantly effect the damping. Viscosity changes in an ideal gas vary with the square root of the absolute temperature and most common gasses differ from the ideal by only about five percent. This produces far less damping variation than a non-compressible fluid.

The compressibility of the gas does add a spring force to the system which must be taken into account. The compressibility of the gas produces a spring force that causes the damping to increase with the amplitude of the oscillations but this non-linearity is an advantage since it provides higher damping for larger amplitude oscillations and lower damping for smaller amplitude oscillations. Higher damping dissipates more energy and thus decreases the settling time for large amplitude vibration which is desired. Lower damping at smaller amplitudes is desirable because high damping at low amplitude oscillations can cause the mass to not move and the damper to cease functioning.

DETAILED DESCRIPTION OF THE PREFERRED EMBODIMENT

Figure 1:
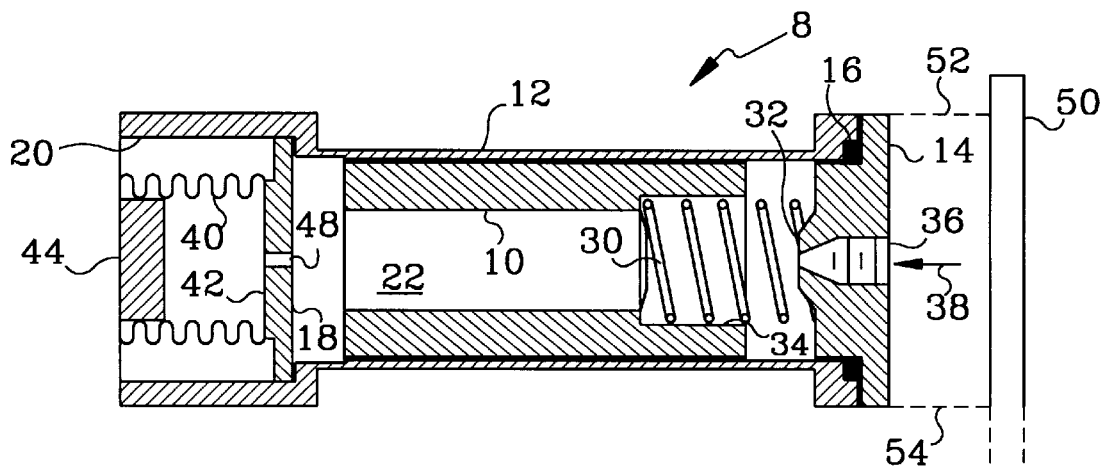
FIG. 1 shows an example of a tuned damper using non-compressible fluid.

In FIG. 1 a tuned mass damper 8, like that described and claimed in our copending application Ser. No. 08/591,922 filed Jan. 25, 1996 and assigned to the assignee of the present invention, is shown comprising a hollow moveable mass 10, slideably mounted in a cylindrical container, or cylinder 12, having a first end piece 14 fastened to cylinder 12 by conventional means and sealed to prevent fluid loss by a grommet 16. A second end piece 18 is fastened at a second end in a recess 20 of cylinder 12. The cylinder 12 and end pieces 14 and 18 form a chamber 22 within which mass 10 may move back and forth.

A spring 30 of predetermined stiffness is fastened at one end thereof to a protrusion 32 of end piece 14 and at the other end thereof to a recess 34 in mass 10 so that mass 10 will be positioned by spring 30 until subjected to a force allowing mass 10 to oscillate horizontally in chamber 22 at a frequency determined by the size of mass 10 and stiffness of spring 30.

The first end piece 14 has a filling port 36 therethrough which allows the introduction of an incompressible damping fluid, shown by arrow 38, into the chamber 22. After filling, port 36 is sealed in a conventional manner.

At the second end of cylinder 12, in recess 20, a thermal expansion bellows 40 is connected at one end thereof to a protrusion 42 in end piece 18 and at the other end thereof to a sealing member 44. End piece 18 has a small opening 48 therethrough connecting the interior of bellows 40 to chamber 22. This allows transfer of fluid from chamber 22 to the interior of bellows 40 to accommodate expansion and contraction of the non-compressible fluid under temperature variations.

In one application of the apparatus of FIG. 1, the damper may be used to compensate for unwanted vibrations of, for example, a boom shown in FIG. 1 by reference numeral 50.

The unwanted oscillations will be transverse to the length of the boom and accordingly it is desired that the mass 10 move in the same direction, i.e. from right to left in FIG. 1. Thus, damper 8 is shown mounted to boom 50 horizontally as indicated by dashed lines 52 and 54 and, as explained above, mass 10 will vibrate 180 degrees out of phase with the boom to help cancel the boom motion.

Figure 3:
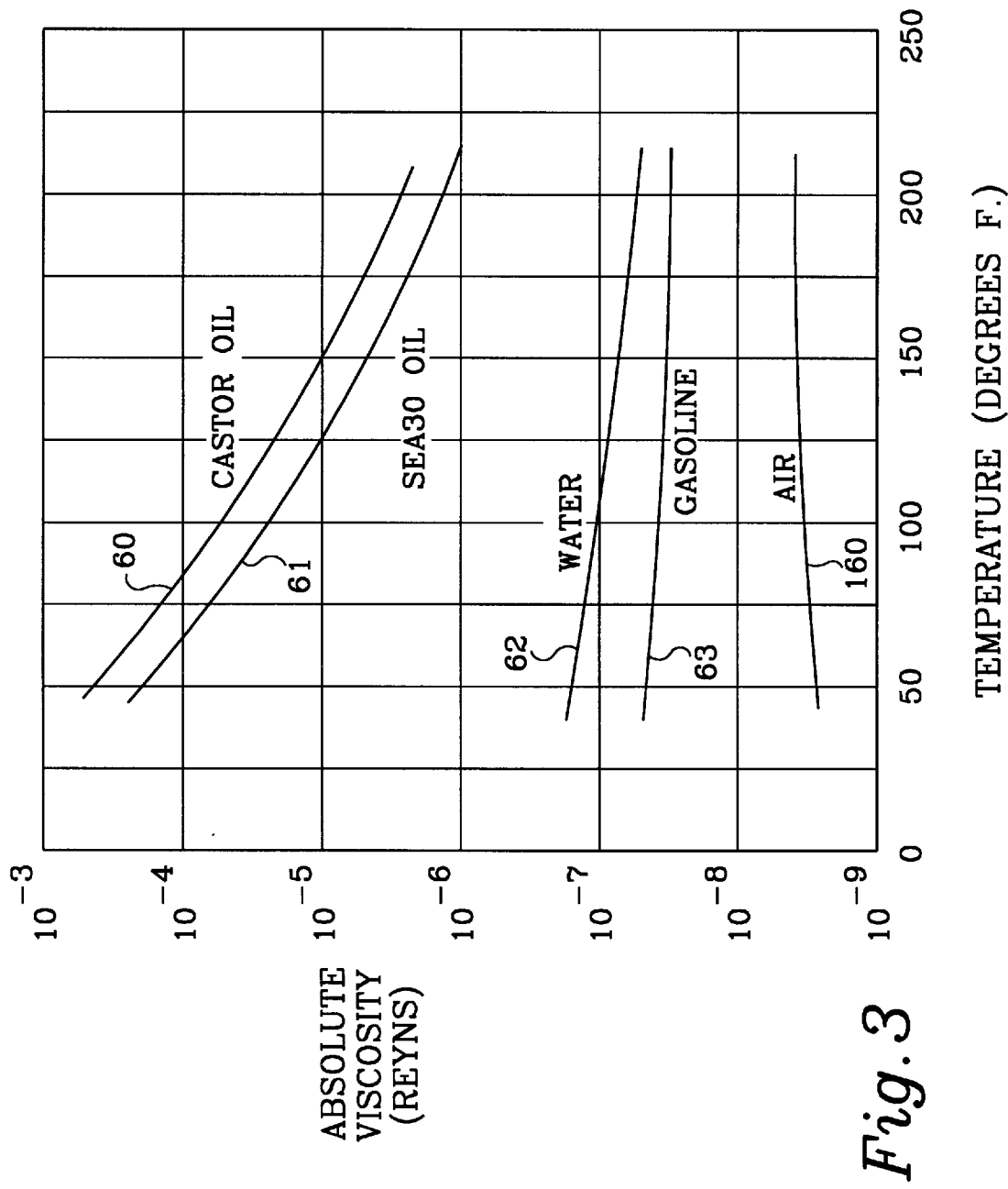

For many applications, the apparatus of FIG. 1 will perform satisfactorily, but where significant temperature variations occur, as in space applications, the viscosity of the non-compressible fluid will have significant variation. FIG. 3 shows the variation of absolute viscosity of several incompressible fluids with temperature and, as seen by curve 60 (for castor oil), curve 61 (for SAE 30 oil), curve 62 (for water), and curve 63 for gasoline), these variations are relatively large. This causes undesirable changes in the damping of the tuned mass damper when incompressible fluids are used.

Another difficulty with the apparatus of FIG. 1 damper is the increased size and weight which becomes necessary in order to have the expandable bellows 40 to compensate for fluid expansion due to temperature variation. These problems are overcome with the improvements of FIG. 2.

Figure 2:
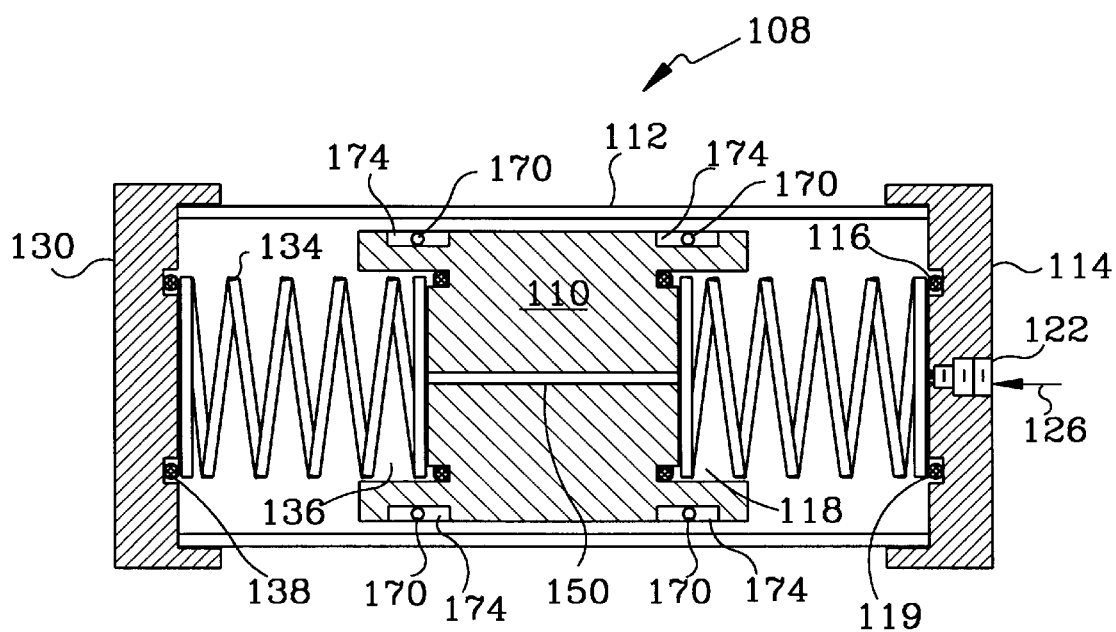
FIG. 2 shows an embodiment of the present invention incorporating compressible fluid; and, FIG. 3 is a graph showing the variation of viscosity of various fluids with temperature.

In FIG. 2, a tuned mass damper 108 (which may also be attached to a beam as in FIG. 1 but not shown in FIG. 2 for simplicity) is shown comprising a moveable mass 110, slideably mounted in a cylindrical container, or cylinder 112, having a first cylindrical end piece 114 fastened to the right end of cylinder 112 by conventional means. A spring 116 has a first end fastened in a recess 118 of mass 110 and a second end fastened in a recess 119 of end piece 114. End piece 114 has a port 122 therethrough for use in filling the damper with a compressible gas as shown by arrow 126. After filling port 126 is sealed in a conventional manner.

Cylindrical container 112 has a second cylindrical end piece 130 fastened to the left end of cylinder 112 by conventional means, and a spring 134 has a first end fastened in a recess 136 of mass 110 and a second end fastened in a recess 138 of end piece 130. It should be noted that the mass 110 could be attached to a single spring as in FIG. 1 without effecting the function of the tuned mass damper. Mass 110 is shown having a restrictive orifice 150 extending between its left and right sides in FIG. 2 so as to permit restricted passage of the gas therethrough. The mass 110 and the stiffness of springs 116 and 134 are chosen to have the frequency of oscillation matching the particular use to which it is to be put e.g. the frequency of the boom to which it will be mounted. The stiffness of the gas is a function of the area of the mass in contact with the gas and the volume and pressure of the gas which can be calculated for various amplitudes of vibration. Because, with delicate instruments used in space applications it is usually desirable to provide the best damping at low boom vibration amplitudes, the variables (mass, spring stiffness and gas stiffness) will be chosen to produce the best damping at these low amplitudes. At higher amplitudes, the damping will increase which, as mentioned above, is a desirable feature.

A gas, such as air or nitrogen, is inserted through port 122 and the cylinder is then sealed. As such, the volume of air in the cylinder 112 cannot change and thus the density of the gas cannot change. The only change in damping characteristics with temperature will occur when the temperature causes a change in viscosity of the gas since pressure changes do not significantly effect the damping. As is seen by curve 160 in FIG. 3, the variation of viscosity of air (or nitrogen which is the principle constituent of air) is very small with temperature changes as compared to the compressible fluids represented by curves 60–63. Thus very little change in damping occurs even though the apparatus is exposed to wide temperature variations. Other gases may have different viscosities but will generally have a flat curve similar to curve 160. Helium has a very low viscosity and might be used where very low damping was desired.

The gas, is compressible, however, and as such will produce a spring force when the mass 110 moves in the cylinder 112. As mentioned above, this force is predictable and can be taken into account when the system is designed. Also, the damping will increase with the amplitude of the movement of mass 110 but this is desirable since at large amplitudes, increased damping is desired and at small amplitudes the damping is desirably less.

As was described in the above referred to copending application, to decrease the friction of the movement of mass 110, a plurality of balls 170 in a plurality of troughs 174 may be employed with, for example, one ball per trough, but their use is not normally critical in the present damper. However, with the use of balls 170, the device is completely self centering so that when the motion decreases to the expected limits, the balls will move to the center and at rest assume the position shown in FIG. 2. This feature assures the device will remove the maximum amount of energy from the system by minimizing mass friction. Using the balls eliminates the sliding friction between the mass 110 and the cylinder 112 and when a single ball is used, there is no friction between balls.

It is thus seen that we have provided a damper that is less affected by temperature changes, is simpler, smaller and lighter than previous tuned mass dampers and is desirably more damped at higher amplitude oscillations and less damped at lower amplitude oscillation. Although the present invention has been described with reference to preferred embodiments, workers skilled in the art will recognize that changes may be made in form and detail without departing from the spirit and scope of the invention. For example, while air/nitrogen has been employed as the compressible gas, other gases may also be employed. Furthermore, when the oscillations to be damped occur in more than one plane, two or more dampers may be mounted on the member to vibrate in the: other planes.

The embodiments of the invention in which an exclusive property or right is claimed are as follows:

1. A tuned mass damper comprising a hollow cylinder having an inner surface, a first end with a filling port to permit the introduction of a compressible fluid into the interior of the cylinder and a second end sealing the interior of the cylinder;

a mass having first and second ends and an outer surface slightly smaller than the inner surface of the cylinder placed in the interior of the cylinder to provide first and second end chambers to receive the compressible fluid;

a first set of at least three grooves of predetermined length proximate a first end of the mass and spaced about the outer surface thereof and a second set of at least three grooves of predetermined length proximate a second end of the mass and space about the outer surface thereof;

a single ball positioned in each groove of the first and second sets and bearing against the inner surface of the cylinder to provide substantially frictionless and self centering motion of the mass within the cylinder;

a spring mounting the mass in the cylinder to allow oscillatory motion of the mass in first and opposite directions; and restrictive conduit means connecting the first and second chambers to permit restrictive flow of the compressible fluid between the first and second chambers.

2. Apparatus according to claim 1 further including mounting means fastening the damper to a structure which may be subject to undesired oscillations, the mounting means positioning said damper so that the undesired oscillations of the structure produce oscillatory motion of the mass at substantially the same frequency but substantially 180 degrees out of phase so as to produce damping of the undesired oscillations.

3. Apparatus according to claim 1 wherein the compressible fluid is air.

4. Apparatus according to claim 1 wherein motion of the mass causes compression of the gas producing a resistance to motion of the mass which varies with the amplitude of the motion and wherein the size of the mass, the stiffness of the spring and the stiffness added by the compression of the gas are chosen to determine the frequency of oscillation of the mass.

5. Apparatus according to claim 4 wherein the frequency of oscillation of the mass is made to best damp the undesired oscillations at low amplitudes.

6. A tuned mass damper for use in damping oscillatory motions of a member to which the damper is mounted comprising:

a container having side portions and end portions;

a mass having an outer surface proximate the side portions of the container and having first and second ends, said mass positioned in said container for oscillatory motion between the end portions;

a first set of at least three grooves of predetermined length proximate the first end of the mass and spaced about the outer surface thereof and a second set of at least three grooves of predetermined length proximate the second end of the mass and space about the outer surface thereof;

a single ball positioned in each groove of the first and second sets and bearing against the side portions of the container to provide substantially frictionless and self centering motion of the mass within the container;

first spring means connected to the first end portion and to the mass;

second spring means connected to the second end portion and to the mass;

a compressible fluid in the interior of the cylinder surrounding the mass to provide damping when the mass moves in the interior of the cylinder, said compressible fluid producing nonlinear resistance to motion of the mass, the amount of the nonlinear resistance, the stiffness of the first and second spring means and the size of the mass being chosen to provide an oscillatory motion at a desired predetermined frequency; and a restrictive passage connecting the end portions to permit restrictive flow of compressible fluid therebetween, the viscosity of the compressible fluid and the restrictiveness of the passage means being selected to provide the proper damping.

7. Apparatus according to claim 6 wherein the damper is connected to a member for use in damping oscillatory motions of the member to which the damper is mounted.

8. Apparatus according to claim 7 wherein the compressible fluid is a gas.

9. Apparatus according to claim 8 wherein the gas is air.

10. The method of varying the damping of a tuned mass damper having a mass which is positioned by a spring in a container so that the mass may oscillate between first and second container ends, comprising the steps of:

A. Providing a plurality of grooves spaced around the ends of the mass with a single ball in each groove in contact with the inner surface of the container to permit substantially frictionless and self centering motion of the mass in the container;

B. Filling the container with a compressible fluid so that upon oscillation of the mass, the fluid provides different resistance to the motion depending on the amplitude of the oscillation; and C. Providing a restrictive passage for the compressible fluid through the mass.

11. The method of claim 10 further comprising the step of:

D. Selecting the compressible fluid so that the frequency of oscillation of the mass is a first predetermined value at a first amplitude and is a second predetermined value that is higher than the first predetermined value at a second amplitude that is higher than the first amplitude.

* * * * *